United States Patent
Bakeev et al.

(10) Patent No.: US 6,281,274 B1
(45) Date of Patent: Aug. 28, 2001

(54) METHOD FOR PREVENTING OR RETARDING THE FORMATION OF GAS HYDRATES

(75) Inventors: Kirill N. Bakeev, Ringwood; Jui-Chang Chuang, Wayne; Thomas Winkler, Maywood; Michael A. Drzewinski; David E. Graham, both of Long Valley, all of NJ (US)

(73) Assignee: ISP Investments Inc., Wilmington, DE (US)

( * ) Notice: Subject to any disclaimer, the term of this patent is extended or adjusted under 35 U.S.C. 154(b) by 0 days.

(21) Appl. No.: 09/415,657

(22) Filed: Oct. 12, 1999

(51) Int. Cl.[7] .................................................. C07C 7/20
(52) U.S. Cl. ............................. 524/376; 137/3; 137/13; 585/15; 585/950
(58) Field of Search .............................. 524/376; 137/13, 137/3; 585/15, 950

(56) References Cited

U.S. PATENT DOCUMENTS 5,723,524 * 3/1998 Cohen et al. ........................ 524/376
6,117,929 * 9/2000 Bakeev et al. ...................... 524/376

FOREIGN PATENT DOCUMENTS

61474 * 10/1976 (RO) .............................. C08F/15/18
1015018 * 12/1980 (SU) .............................. D60M/13/15

* cited by examiner

Primary Examiner—David W. Wu
Assistant Examiner—Tanya Zalukaeva
(74) Attorney, Agent, or Firm—Walter Katz; William J. Davis; Marilyn J. Maue

(57) ABSTRACT

A composition for preventing or retarding the formation of gas hydrates during the transport of a fluid comprising water and a hydrocarbon through a conduit. The composition is a copolymer of vinyl caprolactam and vinyl pyridine, and terpolymers thereof, with vinyl pyrrolidone, preferably including 70–97% by weight vinyl caprolactam. Suitably such polymers have a molecular weight in the range of 500 to 2500, and are made in a polymerization solvent, preferably a glycol ether, most preferably, 2-butoxyethanol; and also including a carrier solvent, preferably monoethylene glycol.

15 Claims, No Drawings

METHOD FOR PREVENTING OR RETARDING THE FORMATION OF GAS HYDRATES

BACKGROUND OF THE INVENTION

1. Field of the Invention

The invention relates to a method for preventing or retarding the formation of gas hydrates, or for reducing the tendency of such hydrates to agglomerate, during the transport of a fluid comprising water and a hydrocarbon through a conduit, and, more particularly, to the addition to the fluid of a single phase composition of a copolymer of vinyl caprolactam and vinyl pyridine, or terpolymers thereof with vinyl pyrrolidone monomer, which is made in a polymerization solvent, and including a carrier solvent different from said polymerization solvent, to inhibit such gas hydrate formation.

2. Description of the Prior Art

It is well known In the art that the formation of gas hydrates in a conduit, e.g. in a pipeline, where an aqueous phase is inherently present, during the transport of liquids such as oil, and of gases, particularly lower hydrocarbons, e.g. methane, ethane, propane, butane, isobutane and natural gas, is a serious problem, especially in areas with a low temperature in the winter season or in the sea. Generally, the ambient temperatures in such areas are so low that gas hydrates are formed in the gas transportation pipeline, due to the inevitable presence of co-produced water therein. Insulation of the pipelines may decrease the opportunity for gas hydrate formation; however, if the field is relatively small and some distance from the production facilities, the cost of providing suitable insulation is too high to make such a field economically attractive. It is also known to add anti-freeze compounds, for example, ethylene glycol or methanol, during transport of such liquids and gases to minimize gas hydrate formation; however, large quantities of these highly flammable compounds are required to be effective which is expensive and unsafe.

Representative of the prior art in this field are U.S. Pat. Nos. 4,915,176; 5,420,370; 5,432,292; and 5,723,524; EPO 0323774A1; EPA 0457375A1; EPA 0526929A1; Can. Pat. Appin. 2,073,577; "Gas Hydrates and Hydrate Prevention", 73 GPA Annual Convention, pages 85–93; WO 96/08456; WO 96/08636; WO 93/25798; WO 94/12761; WO 95/17579; and WO 95/32356.

A Accordingly, it is an object of this invention to provide an improved composition and method for retarding the formation of gas hydrate in a hydrocarbon gas pipeline.

SUMMARY OF THE INVENTION

What is described herein is a single phase composition for effectively preventing or retarding the formation of gas hydrates, or for reducing the tendency of gas hydrates to agglomerate, during the transport of a fluid comprising water and a hydrocarbon, through a conduit. The composition comprises a copolymer of (a) vinyl caprolactam and (b) vinyl pyridine; and, optionally, a terpolymer with vinyl pyrrolidone, preferably wherein the vinyl pyridine is 2- or 4-vinyl pyridine, optionally quaternized e.g. with a $C_1$–$C_{18}$ alkyl halide, e.g. iodide, bromide, chloride or fluoride; having a cloud point >10° C., preferably >15°C.

Most preferably, the composition is made in a polymerization solvent which is a glycol ether, containing an alkoxy group having at least 3 carbon atoms, and most preferably, 2-butoxyethanol (BGE), and includes a carrier solvent different from the polymerization solvent, preferably, monoethylene glycol (MEG).

In preferred embodiments of the invention, the vinyl caprolactam monomer comprises about 70–97% of the polymer, and has a molecular weight of about 500 to 2500.

DETAILED DESCRIPTION OF THE INVENTION

The polymer which exhibits advantageous inhibitory characteristics in the composition of the invention is a copolymer of about 70–97% by weight of vinyl caprolactam and 3–25% by eight of vinyl pyridine, preferably 2- and 4-vinyl pyridine, and, optionally, terpolymers with up to 15% by weight of vinyl pyrrolidone.

Preferably vinyl caprolactam comprises 75–95% of the polymer and vinyl pyridine about 5–15%; optionally vinyl pyrrolidone up to 10%.

The polymers herein may be quaternized, suitably with a $C_1$–$C_{18}$ alkyl halide; e.g. an alkyl iodide.

The composition herein is a single phase system having a cloud point >10° C., preferably >15°C.

The polymer is synthesized from its monomers in a polymerization solvent which preferably is a glycol ether containing an alkoxy group having at least 3 carbon atoms. Representative of such suitable glycol ethers are 2-butoxyethanol (ethylene glycol monobutyl ether); propylene glycol butyl ether; (diethylene glycol) monobutyl ether; and 2-isopropoxy-ethanol. 2-Butoxyethanol (BGE) is most preferred.

The product of the polymerization is a composition of the polymer in the polymerization solvent, e.g. BGE. Generally, the weight ratio of the polymerization solvent to the polymer is about 1:1.5 to 3:3 to 1, preferably about 1.5:1.

The composition is then provided with a suitable carrier solvent such as monoethylene glycol (MEG), methanol, ethanol, propanol, 1,4-butanediol, butanol, pentanol, hexanol, cyclohexyl pyrrolidone, propargyl alcohol, N-methylpyrrolidone and the like, preferably MEG. Preferably the concentration of MEG in the aqueous phase, i.e. under pipeline inhibition conditions, is about 2.5–10 wt. %, preferably 4–5 wt. %.

The thus-formed solution with carrier solvent can be further diluted with a dilution liquid, preferably water or methanol, or mixtures thereof, if desired, to form a use composition for injection into the pipeline. Suitable inhibitor composition to dilution liquid ratio are 0.5:1 to 5:1.

Generally, the polymer solution used in the composition of the invention is present in an amount of about 30 to 60%, preferably 45 to 55%, by weight in admixture with the polymerization solvent. The polymer inhibition concentration in the pipeline, i.e. in the aqueous phase, water being inherently present therein, is about 0.1 to 3%, preferably 0.5–1%, by weight. The solvent* inhibition concentration, accordingly, is about 1 to 9% by weight of the aqueous phase.

The following examples are provided to illustrate the invention.

A. GENERAL METHOD

The gas hydrate inhibition tests were conducted in a 500 ml, 316 stainless steel autoclave vessel having a usable volume of 200 ml, equipped with a thermostated cooling jacket, sapphire window, inlet and outlet, platinum resistance thermometer (PRT) and magnetic stirring pellet. The rig is rated up to 400° C. and down to −25° C. Temperature and pressure are data logged, while the cell content is visually monitored by a boroscope video camera connected to a time lapsed video recorder. Hydrate formation in the rig is detected using a combination of three methods: visual detection of hydrate crystals, decrease in vessel pressure due to gas uptake and by the temperature exotherm created by heat released during hydrate formation.

The rig was cleaned prior to running a blank and/or test solutions. An air drill with wet and dry emery paper was used to remove traces of any adsorbed chemicals therein with a small amount of water being added to the rig. The vessel was then rinsed several times with double distilled water. A blank solution of 200 ml of double distilled water was run to confirm the reproducibility of the test. Formation of hydrates within 5–15 minutes was taken as a standard time for a given set of testing conditions, e.g. Ravenspurn gas, 85 bar and T =5° C.

A Ravenspurn synthetic gas mixture (Southern North Sea) having the following composition was used for hydrate testing:

| Ravenspurn Synthetic Gas | |
|---|---|
| Component | Mol % |
| $CO_2$ | 1.0 |
| Methane | 95.31 |
| Ethane | 2.96 |
| Propane | 0.53 |
| Iso-Butane | 0.1 |
| n-Butane | 0.1 |

B. EXPERIMENTAL PROCEDURE FOR EVALUATION OF HYDRATE INHIBITORS

Pipeline conditions were simulated by placing 100–200 ml of the use polymer solution (with total polymer concentration in the aqueous phase equal to about 1 wt. %) into a vessel fitted with a PTFE stirrer pellet. The rig top of the vessel was replaced and the securing ring tightened. A boroscope and video camera were then attached to the apparatus. The rig was then stirred and allowed to cool to a required temperature. Upon reaching the pre-set temperature, the stirrer was stopped and the video recorder and computer data logger started; The rig was then charged with Ravenspurn gas to reach the required pressure. A slightly higher pressure (2–3 bars) was used to allow for some gas dissolution in the water and the slight drop in pressure as the gas cooled. The stirrer was started at 500 rpm and the temperature (4° C. or 5° C.), pressure (85 bar) and start time ($t_o$) recorded. The run was terminated upon the formation of hydrates, usually at the moment of a pressure drop, which might or might not follow the exotherm, and visual hydrate formation, if a large amount of hydrates was formed and the amplitude of the effect. The final temperature, pressure and time (t) of hydrate formation was noted.

The onset of the hydrate formation time ($t-t_o$ mins) is indicated in the examples given below. The number of a given test rig also is indicated in the brackets []next to the hydrate formation time. Normally, a test was considered to be a pass (success) if no hydrate formation was observed within 48 hours. Some tests were terminated before 48 hours even when no hydrate formation was noted in the rig. The relative efficiencies of the inhibiting polymers are thus proportional to the measured induction times.

Since the equilibrium melting temperature for hydrate decomposition for the Ravenspurn gas in double distilled water and P=85 bar is about 15.5° C., the hydrate sub-cooling is equal to 11.5° C. (T=4° C. is the temperature of the measurements); or 10.5° C. at P=85 bar, T=5° C.

C. EXPERIMENTAL RUNS PREPARATION OF INHIBITOR COMPOSITIONS

Example 1 illustrates the direct 40 weight % of a copolymer of 97% by weight vinyl caprolactam and 3% by weight of 4-vinyl pyridine in 2-butoxy-ethanol (BGE).

EXAMPLE 1

Preparation of Vinyl Caprolactam (VCL)/4-Vinylpyridine (4-Vpy) (97/13) Copolymer in 2-Butoxyethanol 300.00 g of 2-butoxyethanol (BGE) was charged into a 1-l, 4-necked resin kettle, fitted with a reflux condenser, a nitrogen inlet tube, a propeller agitator, a thermal watch/thermocouple and a heating mantle. Nitrogen sparging was started and continued throughout the experiment. The kettle was then heated to 150° C. and maintained at 150±2° C. throughout the experiment while keeping agitation speed at 250 rpm. A premix of 194.0 g of vinyl caprolactam, 6.0 g of 4-vinylpyridine and 4.0 9 of di-t-butyl peroxide initiator (98.5% active) was prepared and pumped into the resin kettle over a period of 2 hours. After the completion of monomer feeding, the reaction mixture was held at 150° C. for 60 minutes. Thereafter, 0.5 g of di-t-butyl peroxide was added hourly, five times, to react out residual monomers. The reaction was then held at 150° C. for an additional 2 hours before cooling to ambient conditions. Vinyl caprolactaml4-vinylpyridine (97/3) copolymer thus obtained was 40% solids solution in 2-butoxyethanol (BGE). Gas chromatography (GC) analysis indicates that residual vinyl caprolactam and 4-vinylpyridine in the polymer are 0.86 and 0.05%, respectively. The polymer has a relative viscosity of 1.061 (1% in BGE, GPC weight-average molecular weight of 1,060, polyethylene glycol as standard).

D. GAS HYDRATE INHIBITION TESTING

Example 2 illustrates the effectiveness of the compositions of the invention to inhibit gas hydrate formation in a hydrocarbon fluid

EXAMPLE 2

The composition of Example 1 prepared at 40 wt. % copolymer in BGE was tested under the experimental conditions of [MEG]=5.4 wt%;

[BGE]=1.5 wt%; [P(VCAP/4VP)]=1.0 wt%; fluid phase composition: saline water/gas condensate ratio =1:1 vol/vol, and [NaCI]=1.0 wt %; and at P =85 bar, T =4° C., which corresponds to 11.5° C. of operating subcooling.

In this experiment, there were 3 passes out of 6 runs (i.e. no hydrate formation for >47 hours) with one failure after 18 hours, evidenced by a small pressure drop (1–2 bars) and no exotherm, thus indicating high inhibition efficiency of the tested formulation at the above sub-cooling**. The times for the onset of gas hydrate formation ($t-t_o$ min) were as follows:

\>3969 min [5]*
\>3969 min [6]
3258 min [4]
1089 min [4]
773 min [3]**
485 min [3]**

\* brackets indicate a given rig number
\*\* Since only one-half inner volume of the autoclave is covered with the fluid phase containing inhibitor solution, the few short induction times observed are abnormal results representing onset of hydrate formation initiated at the metallic parts of the autoclave not contacting the inhibitor solution via water condensation from the vapor phase.

While the invention has been described with particular reference to certain embodiments thereof, it will be understood that changes and modifications may be made which are within the skill of the art. Accordingly, it is intended to be bound only by the following claims, in which:

What is claimed is:

1. A composition for preventing or retarding the formation of gas hydrates or for reducing the tendency of gas hydrates to agglomerate during the transport of a fluid comprising water and a hydrocarbon, through a conduit, consisting essentially of a copolymer of (a) vinyl caprolactam and (b) vinyl pyridine, and, optionally, a terpolymer thereof with (c) vinyl pyrrolidone.

2. A composition according to claim 1 wherein, by weight, (a) is 70–97%; (b) is 3–25%; and (c) is 0–15%.

3. A composition according to claim 2 wherein (a) is 75–95%; (b) is 5–15%; and (c) is 0–10%.

4. A composition according to claim 1 wherein (b) is quaternized.

5. A composition according to claim 4 wherein the quaternization is carried out with a $C_1$–$C_{18}$ alkyl halide.

6. A composition according to claim 5 wherein the halide is iodide.

7. A composition according to claim 1 wherein (b) is a 2- or 4-vinyl pyridine.

8. A composition according to claim 1 which has a cloud point >10° C.

9. A composition according to claim 1 which has a cloud point >15° C.

10. A single phase composition according to claim 1 which is polymerized in butoxyethanol and includes monoethylene glycol as carrier solvent.

11. A composition according to claim 1 wherein (b) is 4-vinyl pyridine quaternized with a $C_1$–$C_{18}$ alkyl halide.

12. A composition according to claim 1 wherein (a) has a molecular weight of about 500 to 2500.

13. A composition according to claim 10 which is applied at a dose level of 0.3–1 wt. %.

14. A single phase composition for preventing or retarding the formation of gas hydrates or for reducing the tendency of gas hydrates to agglomerate, during the transport of a fluid comprising water and a hydrocarbon, through a conduit containing water, consisting essentially of, (a) a solution of a copolymer of vinyl caprolactam and a vinyl pyridine, optionally, a terpolymer with vinyl pyrrolidone, having a molecular weight in the range of about 500 to about 2500, (GPC, polyethylene glycol standard), made in (b) a polymerization solvent which is a glycol ether containing an alkoxy group having at least 3 carbon atoms, and including (c) a carrier solvent, and, optionally, (d) water or methanol, or mixtures thereof.

15. A method of preventing or retarding the formation of gas hydrates or for reducing the tendency of gas hydrates to agglomerate, during the transport of a fluid comprising water and a hydrocarbon through a conduit which comprises including a composition of claims 1 or 14 therein.

\* \* \* \* \*